US012686746B2

(12) United States Patent　　　　(10) Patent No.:　US 12,686,746 B2

Galuska et al.　　　　　　　　　　　　(45) **Date of Patent:　*Jul. 21, 2026**

---

(54) HIGHLY CROSSLINKED POLYMER PARTICULATE

(71) Applicant: ExxonMobil Technology and Engineering Company, Spring, TX (US)

(72) Inventors: Alan A. Galuska, Huffman, TX (US); William Handy, Spring, TX (US); Pavlin B. Entchev, Spring, TX (US); Robert M. Shirley, The Woodlands, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 886 days.

This patent is subject to a terminal disclaimer.

(21) Appl. No.: 16/938,347

(22) Filed: Jul. 24, 2020

(65) Prior Publication Data

US 2021/0047480 A1　　Feb. 18, 2021

Related U.S. Application Data

(60) Provisional application No. 62/944,106, filed on Dec. 5, 2019, provisional application No. 62/888,214, filed on Aug. 16, 2019.

(51) Int. Cl.
*C08J 3/12*　　　(2006.01)
*C08J 3/24*　　　(2006.01)
*C08L 23/06*　　(2006.01)

(52) U.S. Cl.
CPC . *C08J 3/12* (2013.01); *C08J 3/24* (2013.01); *C08L 23/06* (2013.01); *C08J 2323/06* (2013.01); *C08L 2207/07* (2013.01); *C08L 2312/00* (2013.01)

(58) Field of Classification Search
CPC ............. C08J 2323/06; C08J 3/12; C08J 3/24
See application file for complete search history.

(56) References Cited

U.S. PATENT DOCUMENTS 4,366,263 A　*　12/1982　Sato ...................... B29C 67/205
　　　　　　　　　　　　　　　　　　264/55
6,330,916 B1 *　12/2001　Rickards .................. C09K 8/80
　　　　　　　　　　　　　　　　　　507/924

6,638,589 B1 *　10/2003　Jarvenkyla .............. B29C 48/76
　　　　　　　　　　　　　　　　　　428/903.3
2012/0325474 A1　12/2012　Bicerano
2013/0216812 A1 *　8/2013　Cheng ................. C08L 23/0815
　　　　　　　　　　　　　　　　　　525/232
2016/0009888 A1 *　1/2016　Oikawa ...................... C08J 9/18
　　　　　　　　　　　　　　　　　　521/57
2018/0044574 A1　2/2018　Lopez Reyes et al.
2019/0106557 A1　4/2019　Sun et al.
2021/0047480 A1　2/2021　Galuska et al.

FOREIGN PATENT DOCUMENTS

CA　　　　3150432 A1　　2/2021
CA　　　　3150614 A1　　2/2021
CA　　　　3150920 A1　　2/2021
CA　　　　3150923 A1　　2/2021
FR　　　　2922141 A1 *　4/2009　......... B29B 17/0036
GB　　　　2359316 A　　8/2001
WO　　2021034448 A1　　2/2021

OTHER PUBLICATIONS

Kurniati, Seminar Nasional Fisika, Journal of Physics: Conference Series 1805 (2021) 102036). (Year: 2021).*
Narkis, Electrical properties of Carbon Black Filled Crosslinked Polyethylene, Polymer Engineering and Science, Nov. 1981, vol. 21 , No. 16 (Year: 1981).*
Machine translation FR-2922141-A1 (Year: 2024).*
Gheysari, DJ, The effect of high-energy electron beam on mechanical thermal properties of LDPE and HDPE, European Polymer Journal, 2001, pp. 295-302, vol. 37.
Atkinson, Jr et al., Silane cross-linked polyethylene for prosthetic applications Part I. Certain physical and mechanical properties related to the nature of the material, Biomaterials, Oct. 1983, pp. 265-275, vol. 4, No. 4, Butterworth & Co Ltd.
Chodak, Ivan., Properties of Crosslinked Polyolefin-Based Materials, Progress in Polymer Science, Jan. 1995, 36 pages, vol. 20, No. 6, Pergamon Press, Oxford, Great Britain.
Madani, Mohammed et al., Preparation of Granular Crosslinkable Medium-Density Polyethylene, Journal of Applied Polymer Science, 2007, pp. 1873-1879, vol. 104, No. 3, Wiley InterScience, Amsterdam.
Canadian Office Action, mailed Sep. 14, 2023, Application No. 3,150,974, 4 pages.

* cited by examiner

*Primary Examiner* — Alexandre F Ferre
(74) *Attorney, Agent, or Firm* — Troutman Pepper Locke LLP

(57)　　　　　ABSTRACT

Highly crosslinked polymer particulate. The highly crosslinked polymer particulate includes a plurality of crosslinked polymer granules. The crosslinked polymer granules include a highly crosslinked polymeric material. A characteristic dimension of each crosslinked polymer granule of the plurality of crosslinked polymer granules is at least 10 micrometers and at most 5 millimeters.

23 Claims, No Drawings

HIGHLY CROSSLINKED POLYMER PARTICULATE

CROSS-REFERENCE TO RELATED APPLICATIONS

This application claims the benefit of U.S. Provisional Application 62/888,214 filed Aug. 16, 2019 entitled "Cross-linked Granular Polyethylene", the entirety of which is incorporated by reference herein. This application also claims the benefit of U.S. Provisional Application 62/944, 106 filed Dec. 5, 2019 entitled "Highly Crosslinked Polymer Particulate", the entirety of which is incorporated by reference herein. This application is also related to U.S. Provisional Application 62/888,221 filed Aug. 16, 2019 entitled "Method of Manufacturing Crosslinked Granular Polyethylene", the entirety of which is incorporated by reference herein. This application is also related to U.S. Provisional Application 62/890,185 filed Aug. 22, 2019 entitled "Granular Crosslinked Polyethylene as a Hydraulic Fracturing Proppant", the entirety of which is incorporated by reference herein. This application is also related to U.S. Provisional Application 62/890,186 filed Aug. 22, 2019 entitled "Granular Crosslinked Polyethylene as a Loss Circulation Material in a Wellbore Operation Fluid", the entirety of which is incorporated by reference herein. This application is also related to U.S. Provisional Application 62/890,188 filed Aug. 22, 2019 entitled "Granular Crosslinked Polyethylene as a Density Modifier in a Wellbore Operation Fluid Mixture", the entirety of which is incorporated by reference herein. This application is also related to U.S. Provisional Application 62/904,993 filed Sep. 24, 2019 entitled "Granular Crosslinked Polyethylene as a Density Modifier in a Wellbore Operation Fluid Mixture", the entirety of which is incorporated by reference herein.

FIELD OF THE DISCLOSURE

The present disclosure relates generally to highly crosslinked polymer particulate, and more specifically to highly crosslinked polymer particulate that includes crosslinked polyethylene.

BACKGROUND OF THE DISCLOSURE

Polyethylene exhibits chemical and/or material properties that cause it to be widely utilized in industry. While suitable for many applications, polyethylene may be relatively soft, may be flexible, and/or may flow when subject to stress, especially at elevated temperatures. In addition, two polyethylene bodies, when brought into contact with one another under conditions of high stress and/or high temperature, may agglomerate. This softness, flow, and/or agglomeration of conventional polyethylene may be undesirable for certain applications, where materials with a greater hardness, a lower propensity for flow, and/or a decreased potential for agglomeration may be desirable. Thus, there exists a need for highly crosslinked polymer particulate.

Polyethylene is known to have the desirable density ranges that are fairly close to the density range of hydraulics fracturing fluid. To improve its mechanical and thermal properties, the polyethylene is chemically crosslinked and can be further compounded with fillers (e.g. carbon black). These high-strength polyethylene pellets are currently used as intermediate feedstock into extrusion process that produces high-quality plastic products (e.g. high-quality pipes).

SUMMARY OF THE DISCLOSURE

Highly crosslinked polymer particulate. The highly crosslinked polymer particulate includes a plurality of crosslinked polymer granules. A characteristic dimension of each crosslinked polymer granule of the plurality of crosslinked polymer granules is at least 10 micrometers and at most 5 millimeters. The crosslinked polymer granules include a highly crosslinked polymeric material. The highly crosslinked polymeric material may include a plurality of polyethylene polymer chains. The highly crosslinked polymeric material additionally or alternatively may include a plurality of chemical crosslinks. The plurality of chemical crosslinks includes chemical crosslinks that covalently bond a given polyethylene polymer chain of the plurality of polyethylene polymer chains to another polyethylene polymer chain of the plurality of polyethylene polymer chains.

DETAILED DESCRIPTION AND BEST MODE OF THE DISCLOSURE

Highly crosslinked polymer particulate, according to the present disclosure, includes a plurality of crosslinked polymer granules. The plurality of crosslinked polymer granules each contains, or each crosslinked polymer granule of the plurality of crosslinked polymer granules contains, a polymeric material, which also may be referred to herein as a crosslinked polymeric material and/or as a highly crosslinked polymeric material. The highly crosslinked polymeric material includes a plurality of polyethylene polymer chains and a plurality of chemical crosslinks. The plurality of chemical crosslinks includes chemical crosslinks that covalently bond a given polyethylene polymer chain of the plurality of polyethylene polymer chains to another polyethylene polymer chain of the plurality of polyethylene polymer chains.

In some examples, the plurality of polyethylene polymer chains may include a plurality of linear polyethylene polymer chains. In some examples, each polyethylene polymer chain of the plurality of polyethylene polymer chains includes a plurality of methylene repeat units and/or a plurality of ethylene repeat units covalently bonded to one another to form a plurality of carbon-carbon bonds.

In some examples, at least a subset of the plurality of polyethylene polymer chains includes a branched polymer chain. The branched polymer chain may include at least one branch group, which may extend from a polymer backbone of the branched polymer chain. In some such examples, a given chemical crosslink of the plurality of chemical crosslinks may extend from the at least one branch group.

The at least one branch group, when present, may include any suitable number of carbon atoms and/or may have any suitable length. As examples, the at least one branch group may include at least 10, at least 25, at least 50, at least 100, at least 500, at least 1,000, at least 5,000, at least 10,000, at least 25,000, and/or at least 50,000 carbon atoms. The carbon atoms that form the at least one branch group may be arranged linearly, such as along a branch group backbone of the at least one branch group. Alternatively, the carbon atoms that form the at least one branch group may, themselves, form sub-branches. Stated another way, the at least one branch group may, itself, be branched.

In some examples, at least a subset of the plurality of polyethylene polymer chains includes a pendant group that extends from the polymer backbone of the subset of the plurality of polyethylene polymer chains. In some such examples, a given chemical crosslink of the plurality of chemical crosslinks may extend from the pendant group. The pendant group, when present, may include any suitable number of carbon atoms. As examples, the pendant group may include at least 1, at least 2, at least 3, at least 4, at least 5, at least 6, at least 7, at least 8, at least 10, at least 15, at least 20, at most 50, at most 40, at most 30, at most 20, at most 15, at most 12, at most 10, at most 8, and/or at most 6 carbon atoms.

The pendant group may have and/or define any suitable structure, including linear structures, branched structures, cyclic structures, and/or combinations thereof. A specific example of the pendant group includes pendant groups that may decrease, or limit, a degree of crosslinking of the plurality of crosslinked polymer granules, such as via increasing a minimum distance between adjacent polyethylene polymer chains and/or by making it difficult for the polymer backbones of adjacent polyethylene polymer chains to closely pack. Examples of such pendant groups include a methyl group, an ethyl group, a propyl group, a butyl group, a pentyl group, a hexyl group, a heptyl group, an octyl group, a nonyl group, and/or a decyl group.

In some examples, and prior to formation of the plurality of chemical crosslinks, the pendant group may include a ring, a cyclic structure, and/or a double bond, which may permit and/or facilitate formation of a corresponding chemical crosslink. Examples of such pendant groups include a cyclic hydrocarbon, a bridged cyclic hydrocarbon, a norbornene-derived pendant group, an ethylidene-derived pendant group, and/or a vinyl norbornene-derived pendant group.

The plurality of polyethylene polymer chains may be highly crosslinked via the plurality of chemical crosslinks. The plurality of polyethylene polymer chains may have and/or define any suitable degree of crosslinking, or average degree of crosslinking. Examples of the average degree of crosslinking include at least 0.01%, at least 0.1%, at least 1%, at least 2%, at least 3%, at least 4%, at least 5%, at least 6%, at least 8%, at least 10%, at least 12%, at least 14%, at least 16%, at least 18%, at least 20%, at least 25%, at least 30%, at least 35%, at least 40%, at least 45%, and/or at least 50%. In some examples, the highly crosslinked polymeric material within a given crosslinked polymer granule may be so highly crosslinked that the given crosslinked polymer granule may be defined by, at least substantially entirely by, or even entirely by a single polymeric molecule. As used herein, the phrase "degree of crosslinking" may refer to a mole percentage, or an average mole percentage, of repeat units within a given polyethylene polymer chain that are crosslinked to another polyethylene polymer chain. For example, a polyethylene polymer chain with 100 repeat units and one crosslink would exhibit a "degree of crosslinking" of 1/100=1%. Similarly, a polyethylene polymer chain with 100 repeat units and 10 crosslinks would exhibit a "degree of crosslinking" of 10/100=10%.

Each chemical crosslink may extend from any suitable portion of a given polyethylene polymer chain to any suitable portion of another polyethylene polymer chain. For example, a chemical crosslink may extend from an ethylene repeat unit of a given polyethylene polymer chain to an ethylene repeat unit of another polyethylene polymer chain to form a covalent bond therebetween. As another example, for examples in which at least a subset of the plurality of polyethylene polymer chains includes a pendant group, a chemical crosslink may extend from a portion of a pendant group included in a given polyethylene polymer chain to a pendant group of another polyethylene polymer chain. Alternatively, the chemical crosslink may extend from a polymer backbone of a given polyethylene polymer chain to a pendant group of another polyethylene polymer chain.

In some examples, the plurality of chemical crosslinks may be distributed, evenly distributed, or even homogeneously distributed throughout the plurality of crosslinked polymer granules. Stated another way, and in these examples, the plurality of chemical crosslinks may be distributed throughout the plurality of crosslinked polymer granules.

In some examples, the plurality of chemical crosslinks may be heterogeneously distributed within each crosslinked polymer granule, such as when the plurality of chemical crosslinks is preferentially distributed proximate an external surface of each crosslinked polymer granule. Stated another way, each crosslinked polymer granule may include an external shell that exhibits a higher degree of crosslinking relative to a remainder of the crosslinked polymer granule.

The plurality of crosslinked polymer granules may have and/or define any suitable structure. As examples, the plurality of crosslinked polymer granules may include and/or be a plurality of high density polyethylene granules and/or a plurality of crosslinked high density polyethylene granules.

In addition, the plurality of crosslinked polymer granules may have and/or define any suitable shape. As examples, the plurality of crosslinked polymer granules may include a plurality of irregularly shaped crosslinked polymer granules, a plurality of spheroid-shaped crosslinked polymer granules, a plurality of at least partially spherical crosslinked polymer granules, a plurality of spherical crosslinked polymer granules, a plurality of at least partially cylindrical crosslinked polymer granules, a plurality of cylindrical crosslinked polymer granules, and/or a plurality of rod-shaped crosslinked polymer granules. In some examples, the plurality of crosslinked polymer granules may include polyethylene particles produced by a polyethylene reactor and subsequently crosslinked to form the plurality of crosslinked polymer granules.

The plurality of crosslinked polymer granules may include recycled polyethylene. As an example, the highly crosslinked polymer particulate, or the plurality of crosslinked polymer granules that comprise the highly crosslinked polymer particulate, may include at least a threshold fraction of a post-consumer granular polymeric material. Examples of the threshold fraction of the post-consumer granular polymeric material include 5 weight percent, 10 weight percent, 15 weight percent, 20 weight percent, 25 weight percent, 30 weight percent, 40 weight percent, 50 weight percent, 60 weight percent, 70 weight percent, 80 weight percent, 90 weight percent, 95 weight percent, 99 weight percent, and/or 100 weight percent.

A characteristic dimension of each crosslinked polymer granule is within a threshold characteristic dimension range of at least 10 micrometers and at most 5 millimeters. As more specific examples, a lower limit of the characteristic dimension range may be at least 10 micrometers, at least 15 micrometers, at least 20 micrometers, at least 25 micrometers, at least 30 micrometers, at least 40 micrometers, at least 50 micrometers, at least 75 micrometers, at least 100 micrometers, at least 125 micrometers, at least 150 micrometers, at least 200 micrometers, at least 250 micrometers, at least 300 micrometers, at least 400 micrometers, at least 500 micrometers, at least 600 micrometers, at least 700 micrometers, at least 800 micrometers, at least 900 micrometers, and/or at least 1,000 micrometers. Additionally or alternatively, an upper limit of the characteristic dimension range may be at most 5 millimeters, at most 3.5 millimeters, at most 3 millimeters, at most 2.5 millimeters, at most 2 millimeters, at most 1.5 millimeters, at most 1.25 millimeters, at most 1 millimeter, at most 900 micrometers, at most 800 micrometers, at most 700 micrometers, at most 600 micrometers, at most 500 micrometers, at most 400 micrometers, and/or at most 300 micrometers.

Examples of the characteristic dimension include a maximum extent of each crosslinked polymer granule and/or a diameter of each crosslinked polymer granule. Additional examples of the characteristic dimension include an effective diameter of each crosslinked polymer granule and/or a minimum diameter of a sphere that fully contains each crosslinked polymer granule.

As used herein, the phrase "highly crosslinked" may be utilized to modify and/or to describe polymeric material, polymer granules that are at least partially formed from the polymeric material, and/or polymer particulate that includes the polymer granules. Such polymeric material, polymer granules, and/or polymer particulate, when "highly crosslinked," include polyethylene polymer chains with a degree of crosslinking sufficient to provide the highly crosslinked polymeric material, the highly crosslinked polymer granules, and/or the highly crosslinked polymer particulate with one or more of the below-described properties. Stated another way, a degree of crosslinking needed to provide the polymeric material, the polymer granules, and/or the polymer particulate with one or more of the below-described properties indicates that the polymeric material is a highly crosslinked polymeric material, that the polymer granules are highly crosslinked polymer granules, and/or the polymer particulate is a highly crosslinked polymer particulate in the context of the instant disclosure.

As an example, and upon fluid contact with naturally occurring liquid hydrocarbons, such as crude oil, within a hydrocarbon well, the highly crosslinked polymer particulate disclosed herein may undergo less than a threshold increase in mass due to absorption of the naturally occurring liquid hydrocarbons. Examples of the threshold increase in mass include threshold increases of 0.05%, 0.1%, 0.25%, 0.5%, 0.75%, 1%, 2%, 3%, 4%, and/or 5%.

As another example, and upon fluid contact with crude oil for a time period of 8 weeks, at a temperature of 85 degrees Celsius, and under a uniaxial stress of 35 Megapascals, the highly crosslinked polymer particulate disclosed herein undergoes at most a threshold increase in strain. Examples of the threshold increase in strain include increases of 1%, 2%, 3%, 4%, 5%, 6%, 8%, and/or 10%.

As yet another example, and when subjected to a confining stress of 42 Megapascals at a temperature of 85 degrees Celsius, a monolayer of the highly crosslinked polymer particulate disclosed herein defines at least a threshold fluid conductivity. Examples of the threshold fluid conductivity include fluid conductivities of $0.5 \times 10^4$ micrometers$^3$, $1 \times 10^4$ micrometers$^3$, $1.5 \times 10^4$ micrometers$^3$, $1.75 \times 10^4$ micrometers$^3$, $2 \times 10^4$ micrometers$^3$, $2.25 \times 10^4$ micrometers$^3$, $2.75 \times 10^4$ micrometers$^3$, $3 \times 10^4$ micrometers$^3$, $3.5 \times 10^4$ micrometers$^3$, $4 \times 10^4$ micrometers$^3$, $4.5 \times 10^4$ micrometers$^3$, $5 \times 10^4$ micrometers$^3$, and/or $6 \times 10^4$ micrometers$^3$.

As another example, the highly crosslinked polymer particulate disclosed herein may have at least a threshold onset of melting temperature. Examples of the threshold onset of melting temperature include temperatures of 40 degrees Celsius, 45 degrees Celsius, 50 degrees Celsius, 55 degrees Celsius, 60 degrees Celsius, 65 degrees Celsius, 70 degrees Celsius, 75 degrees Celsius, 80 degrees Celsius, 85 degrees Celsius, 90 degrees Celsius, 95 degrees Celsius, 100 degrees Celsius, 105 degrees Celsius, and/or 110 degrees Celsius.

As yet another example, the highly crosslinked polymer particulate disclosed herein may have at least a threshold melting temperature. Examples of the threshold melting temperature include temperatures of 60 degrees Celsius, 65 degrees Celsius, 70 degrees Celsius, 75 degrees Celsius, 80 degrees Celsius, 85 degrees Celsius, 90 degrees Celsius, 95 degrees Celsius, 100 degrees Celsius, 105 degrees Celsius, 110 degrees Celsius, 115 degrees Celsius, 120 degrees Celsius, 125 degrees Celsius, 130 degrees Celsius, and/or 135 degrees Celsius.

As another example, the highly crosslinked polymer particulate disclosed herein may exhibit less than a threshold strain when subject to a stress of 35 Megapascals at a temperature of 85 degrees Celsius. Examples of the threshold strain include threshold strains of 40%, 39%, 38%, 37%, 36%, 35%, 34%, 33%, 32%, 31%, and/or 30%.

As yet another example, and when compared to an analogous uncrosslinked polymer particulate, the highly crosslinked polymer particulate disclosed herein may exhibit at least a threshold decrease in strain when subject to a stress of 35 Megapascals at a temperature of 85 degrees Celsius. Examples of the threshold decrease in strain include decreases of 10%, 9%, 8%, 7%, 6%, 5%, 4%, 3%, and/or 2%.

As used herein, the phrase "analogous uncrosslinked polymer particulate," when utilized to compare to the highly crosslinked polymer particulate disclosed herein, may include an uncrosslinked polymer particulate that has and/or defines an identical chemical structure to that of the highly crosslinked polymer particulate with the exception that the uncrosslinked polymer particulate does not include the plurality of chemical crosslinks. Stated another way, a granular polymeric material may be crosslinked to form and/or define the highly crosslinked polymer particulate, and the analogous uncrosslinked polymer particulate may refer to the granular polymeric material prior to being crosslinked to form the highly crosslinked polymer particulate.

The highly crosslinked polymeric material, the highly crosslinked polymer granules, and/or the highly crosslinked polymer particulate disclosed herein may, in addition to one or more of the above-described properties, also, or optionally also, exhibit one or more of the below-described properties. As an example, the highly crosslinked polymer particulate may define a particulate density. Examples of the particulate density include densities of at least 0.8 grams per cubic centimeter (g/cc), at least 0.82 g/cc, at least 0.84 g/cc, at least 0.86 g/cc, at least 0.88 g/cc, at least 0.9 g/cc, at least 0.92 g/cc, at least 0.94 g/cc, at least 0.96 g/cc, at least 0.98 g/cc, at least 1 g/cc, at most 2.6 g/cc, at most 2.4 g/cc, at most 2.2 g/cc, at most 2 g/cc, at most 1.8 g/cc, at most 1.6 g/cc, at most 1.4 g/cc, at most 1.2 g/cc, at most 1.1 g/cc, at most 1 g/cc, at most 0.99 g/cc, at most 0.98 g/cc, at most 0.97 g/cc, and/or at most 0.96 g/cc.

As another example, and when compared to the analogous uncrosslinked polymer particulate, the highly crosslinked polymer particulate may resist fusing of the plurality of crosslinked polymer granules when exposed to a compressive force. Stated another way, fusing of the highly crosslinked polymer particulate may be quantitatively less than fusing of the analogous uncrosslinked polymer particulate. As examples, fusing of the highly crosslinked polymer particulate may be at least 10% less, at least 20% less, at least 30% less, at least 40% less, at least 50% less, at least 60% less, at least 70% less, at least 80% less, and/or at least 90% less than fusing of the analogous uncrosslinked polymer particulate when exposed to the compressive force.

As yet another example, and when compared to the analogous uncrosslinked polymer particulate, the highly crosslinked polymer particulate may resist flowing of the plurality of crosslinked polymer granules when exposed to the compressive force. Stated another way, the flow of the highly crosslinked polymer particulate may be quantitatively less than the flow of the analogous uncrosslinked polymer particulate. As examples, flow of the highly crosslinked polymer particulate may be at least 10% less, at least 20% less, at least 30% less, at least 40% less, at least 50% less, at least 60% less, at least 70% less, at least 80% less, and/or at least 90% less than the flow of the analogous uncrosslinked polymer particulate when exposed to the compressive force.

As another example, and when compared to the analogous uncrosslinked polymer particulate, the highly crosslinked polymer particulate may maintain fluid permeability among and/or between the plurality of crosslinked polymer granules when exposed to the compressive force. Stated another way, the fluid permeability of the highly crosslinked polymer particulate may decrease to a lesser extent when compared to fluid permeability of the analogous uncrosslinked polymer particulate. As examples, fluid permeability of the highly crosslinked polymer particulate may decrease at least 10% less, at least 20% less, at least 30% less, at least 40% less, at least 50% less, at least 60% less, at least 70% less, at least 80% less, and/or at least 90% less than the fluid permeability of the analogous uncrosslinked polymer particulate when exposed to the compressive force.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

INDUSTRIAL APPLICABILITY

The highly crosslinked polymer particulate disclosed herein is applicable to industries that utilize polyethylene.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A crosslinked polymer particulate, comprising:
   a plurality of crosslinked polymer granules, each containing a crosslinked polymeric material that includes:
   (i) a plurality of polyethylene polymer chains; and
   (ii) a plurality of chemical crosslinks, wherein the plurality of chemical crosslinks includes chemical crosslinks that covalently bond a given polyethylene polymer chain of the plurality of polyethylene polymer chains to another polyethylene polymer chain of the plurality of polyethylene polymer chains, wherein the plurality of crosslinked polymer chains has an average degree of crosslinking of at least 0.1%; and wherein a characteristic dimension of each crosslinked polymer granule of the plurality of crosslinked polymer granules is at least 10 micrometers and at most 5 millimeters, wherein, when subjected to a confining stress of 42 Megapascals at a temperature of 85 degrees Celsius, a monolayer of the crosslinked polymer particulate defines a fluid conductivity of at least $1 \times 10^4$ micrometers$^3$.

2. The crosslinked polymer particulate of claim 1, wherein the plurality of polyethylene polymer chains includes a plurality of linear polyethylene polymer chains.

3. The crosslinked polymer particulate of claim 1, wherein at least a subset of the plurality of polyethylene polymer chains further includes a branched polymer chain, wherein the branched polymer chain includes at least one branch group that extends from a polymer backbone of the branched polymer chain.

4. The crosslinked polymer particulate of claim 3, wherein a given chemical crosslink of the plurality of chemical crosslinks extends from the at least one branch group.

5. The crosslinked polymer particulate of claim 1, wherein at least a subset of the plurality of polyethylene polymer chains includes a pendant group that extends from a polymer backbone of the subset of the plurality of polyethylene polymer chains.

6. The crosslinked polymer particulate of claim 5, wherein a given chemical crosslink of the plurality of chemical crosslinks extends from the pendant group.

7. The crosslinked polymer particulate of claim 5, wherein the pendant group is selected from the group consisting of:
   (i) a methyl group;
   (ii) an ethyl group;
   (iii) a propyl group;
   (iv) a butyl group;
   (v) a pentyl group;
   (vi) a hexyl group;
   (vii) a heptyl group;
   (viii) an octyl group;
   (ix) a nonyl group; and
   (x) a decyl group.

8. The crosslinked polymer particulate of claim 5, wherein the pendant group is selected from the group consisting of:
   (i) a cyclic hydrocarbon;
   (ii) a bridged cyclic hydrocarbon;
   (iii) a norbornene-derived pendant group;
   (iv) an ethylidene-derived pendant group; and
   (v) a vinyl norbornene-derived pendant group.

9. The crosslinked polymer particulate of claim 1, wherein a maximum extent of the plurality of crosslinked polymer granules is at least one of:
   (i) at least 100 micrometers and at most 2 millimeters;
   (ii) at least 250 micrometers and at most 2 millimeters; and
   (iii) at least 25 micrometers and at most 1 millimeter.

10. The crosslinked polymer particulate of claim 1, wherein, upon fluid contact with naturally occurring liquid hydrocarbons within a hydrocarbon well, the crosslinked polymer particulate undergoes less than a 0.5% increase in mass due to absorption of the naturally occurring liquid hydrocarbons.

11. The crosslinked polymer particulate of claim 1, wherein, upon fluid contact with crude oil for a time period of 8 weeks at a temperature of 85 degrees Celsius and a uniaxial stress of 35 Megapascals, the crosslinked polymer particulate exhibits at most a 5% increase in strain.

12. The crosslinked polymer particulate of claim 1, wherein the crosslinked polymer particulate has an onset of melting temperature of at least 65 degrees Celsius.

13. The crosslinked polymer particulate of claim 1, wherein the crosslinked polymer particulate has a melting temperature of at least 85 degrees Celsius.

14. The crosslinked polymer particulate of claim 1, wherein the crosslinked polymer particulate has a density of at least 0.8 grams per cubic centimeter.

15. The crosslinked polymer particulate of claim 1, wherein the crosslinked polymer particulate has a density of at least 0.96 grams per cubic centimeter.

16. The crosslinked polymer particulate of claim 1, wherein the crosslinked polymer particulate has a density of at most 2.0 grams per cubic centimeter.

17. The crosslinked polymer particulate of claim 1, wherein the crosslinked polymer particulate has a density of at most 0.97 grams per cubic centimeter.

18. The crosslinked polymer particulate of claim 1, wherein, when compared to an analogous uncrosslinked polymer particulate, the crosslinked polymer particulate exhibits at least a 5% decrease in strain when subject to a stress of 35 Megapascal at a temperature of 85 degrees Celsius.

19. The crosslinked polymer particulate of claim 1, wherein the plurality of polyethylene polymer chains has an average degree of crosslinking of at least 5%.

20. The crosslinked polymer particulate of claim 1, wherein the monolayer of the crosslinked polymer particulate defines a fluid conductivity of at least $2 \times 10^4$ micrometers$^3$.

21. The crosslinked polymer particulate of claim 1, wherein the monolayer of the crosslinked polymer particulate defines a fluid conductivity of at least $3 \times 10^4$ micrometers$^3$.

22. The crosslinked polymer particulate of claim 1, wherein the monolayer of the crosslinked polymer particulate defines a fluid conductivity of at least $4 \times 10^4$ micrometers$^3$.

23. The crosslinked polymer particulate of claim 1, wherein the monolayer of the crosslinked polymer particulate defines a fluid conductivity of at least $5 \times 10^4$ micrometers$^3$.

\* \* \* \* \*